United States Patent
Sakurai

(10) Patent No.: US 11,171,382 B2
(45) Date of Patent: Nov. 9, 2021

(54) ELECTRICITY STORAGE CELL AND MANUFACTURING METHOD OF ELECTRICITY STORAGE CELL

(71) Applicant: Honda Motor Co., Ltd., Tokyo (JP)

(72) Inventor: Atsushi Sakurai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 16/589,056

(22) Filed: Sep. 30, 2019

(65) Prior Publication Data

US 2020/0127260 A1    Apr. 23, 2020

(30) Foreign Application Priority Data

Oct. 18, 2018 (JP) .............................. JP2018-196887

(51) Int. Cl.
| H01M 50/24 | (2021.01) |
| H01M 50/20 | (2021.01) |
| H01M 50/183 | (2021.01) |

(52) U.S. Cl.
CPC ......... *H01M 50/24* (2021.01); *H01M 50/183* (2021.01); *H01M 50/20* (2021.01)

(58) Field of Classification Search
CPC ..... H01M 50/24; H01M 50/183; H01M 50/20
See application file for complete search history.

(56) References Cited

U.S. PATENT DOCUMENTS

| 1,235,648 | A | * | 8/1917 | Bosson et al. | ........ | H01M 10/16 |
| | | | | | | 429/186 |
| 2011/0262799 | A1 | * | 10/2011 | Kim | ...................... | H01M 50/20 |
| | | | | | | 429/156 |
| 2013/0216887 | A1 | * | 8/2013 | Wayne | ................ | H01M 10/647 |
| | | | | | | 429/120 |
| 2014/0141308 | A1 | * | 5/2014 | Christian | ............ | H01M 50/258 |
| | | | | | | 429/99 |

FOREIGN PATENT DOCUMENTS

JP    2017-111893    6/2017

* cited by examiner

*Primary Examiner* — Olatunji A Godo
(74) *Attorney, Agent, or Firm* — JCIPRNET

(57) ABSTRACT

The electricity storage cell is an electricity storage cell in which battery elements are accommodated inside a cell can and an opening portion on the top of the cell can is sealed by an opening sealing body; inside the cell can, there is an expansion force absorber which is capable of absorbing expansion force of the battery elements by receiving expansion of the battery elements and compressing; the battery elements are disposed between the expansion force absorber and an inner wall surface of the cell can; and the expansion force absorber has a height corresponding to the height of the battery elements, and has a lower rigidity on the opening sealing body side than in a central portion of the height direction of the cell can, or has a smaller thickness on the opening sealing body side than in the central portion of the height direction of the cell can.

12 Claims, 11 Drawing Sheets

ELECTRICITY STORAGE CELL AND MANUFACTURING METHOD OF ELECTRICITY STORAGE CELL

CROSS-REFERENCE TO RELATED APPLICATION

This application claims the priority benefits of Japan Patent Application No. 2018-196887, filed on Oct. 18, 2018. The entirety of the above-mentioned patent application is hereby incorporated by reference herein and made a part of this specification.

BACKGROUND

Technical Field

The disclosure relates to an electricity storage cell and a manufacturing method of an electricity storage cell.

Related Art

An electricity storage module mounted on a hybrid car, an electric car or the like is configured by a plurality of electricity storage cells. Generally, the electricity storage cell is configured by accommodating a battery element having a positive electrode and a negative electrode along with an electrolytic solution inside a container made of metal which is referred to as a cell can, and sealing an upper opening portion by an opening sealing body. A pair of positive and negative electrode terminals protrudes on the opening sealing body.

Meanwhile, the battery element inside the electricity storage cell expands by charge and discharge. When the battery element expands, the cell can of the electricity storage cell deforms to bulge outside. Therefore, it is conventionally known that a plurality of electricity storage cells are compressed in a lamination direction to be accommodated into a case and are used in a state of pressurizing the electricity storage cells, thereby suppressing expansion of the battery element and achieving improvement of battery performance (for example, see patent literature 1).

LITERATURE OF RELATED ART

Patent Literature

[Patent literature 1] Japanese Laid-open No. 2017-111893

However, it is difficult to completely suppress expansion of the battery element even if the electricity storage cell is pressurized. When the cell can deforms due to the expansion of the battery element, a stress load is concentrated especially on a joint portion between the cell can and the opening sealing body, which may lead to breakage of the joint portion in some cases.

The embodiments of the disclosure provide an electricity storage cell and a manufacturing method of an electricity storage cell which can reduce the stress load on the joint portion between the cell can and the opening sealing body and caused by the expansion of the battery element.

SUMMARY

The electricity storage cell of the disclosure is an electricity storage cell (for example, an electricity storage cell 1), in which a battery element (for example, a first battery element 2A, a second battery element 2B described later) is accommodated inside a cell can (for example, a cell can 10 described later), and an upper opening portion (for example, an opening portion 10a described later) of the cell can is sealed by an opening sealing body (for example, an opening sealing body 11 described later), wherein, inside the cell can, there is an expansion force absorber (for example, an expansion force absorber 4 described later) which is sheet-like and capable of absorbing expansion force of the battery element by receiving expansion of the battery element and compressing; the battery element is disposed between the expansion force absorber and an inner wall surface (for example, an inner wall surface 10b described later) of the cell can; and the expansion force absorber has a height corresponding to the height of the battery element, and has a lower rigidity on the opening sealing body side than in a central portion of the height direction of the cell can, or has a smaller thickness on the opening sealing body side than in the central portion of the height direction of the cell can.

The electricity storage cell of an embodiment of the disclosure is an electricity storage cell (for example, an electricity storage cell 1 described later), in which a battery element (for example, a first battery element 2A, a second battery element 2B described later) and an electrolytic solution are accommodated inside a cell can (for example, a cell can 10 described later), and an upper opening portion (for example, an opening portion 10a described later) of the cell can is sealed by an opening sealing body (for example, an opening sealing body 11 described later), wherein inside the cell can, there is an expansion force absorber (for example, an expansion force absorber 4 described later) which is sheet-like and capable of absorbing expansion force of the battery element by receiving expansion of the battery element and compressing; the battery element is disposed between the expansion force absorber and an inner wall surface (for example, an inner wall surface 10b described later) of the cell can; and the expansion force absorber is sealed into an impermeable film (for example, an impermeable film 5 described later).

The manufacturing method of electricity storage cell of an embodiment of the disclosure is a manufacturing method of an electricity storage cell (for example, an electricity storage cell 1 described later) in which a battery element (for example, a first battery element 2A, a second battery element 2B described later) is accommodated inside a cell can (for example, a cell can 10 described later), and an upper opening portion (for example, an opening portion 10a described later) of the cell can is sealed by an opening sealing body (for example, an opening sealing body 11 described later), wherein an expansion force absorber (for example, an expansion force absorber 4 described later) which is sheet-like and capable of absorbing expansion force of the battery element by receiving expansion of the battery element and compressing is laminated with the battery element; the expansion force absorber has a height corresponding to the height of the battery element, and has a lower rigidity on the opening sealing body side than in a central portion of the height direction of the cell can, or has a smaller thickness on the opening sealing body side than in the central portion of the height direction of the cell can; the expansion force absorber is inserted along with the battery element into the cell can in a state of being crushed in a thickness direction; after that, the battery element is pressed to an inner wall surface (for example, an inner wall surface 10b described later) of the cell can and held by the expansion of the expansion force absorber.

DESCRIPTION OF THE EMBODIMENTS

Figure 1:
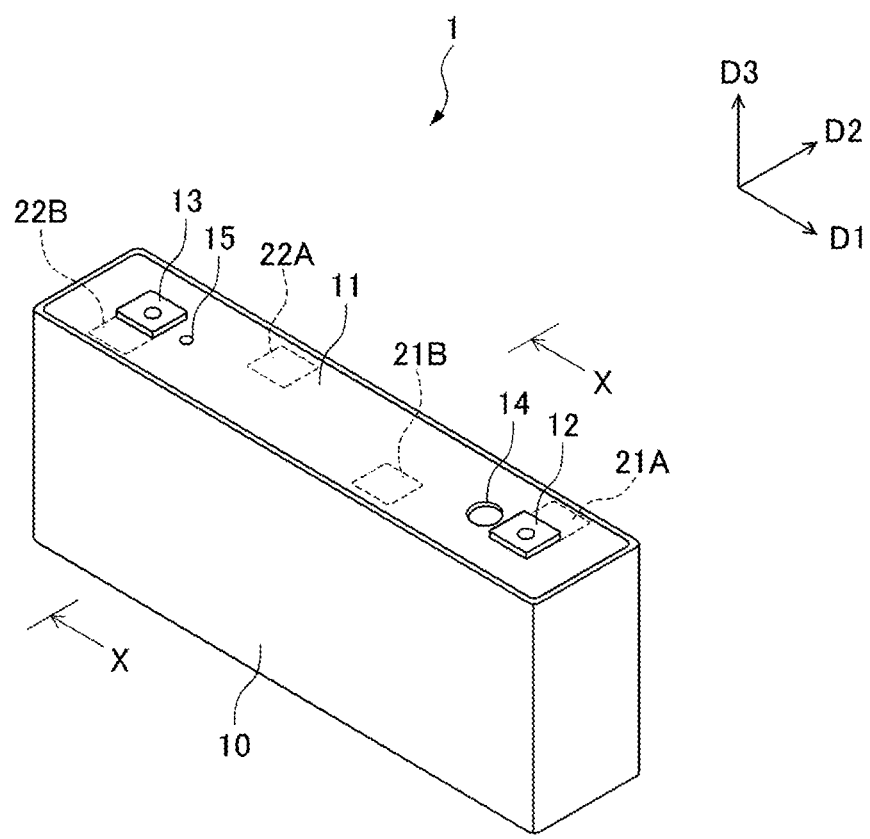
FIG. 1 is a perspective view showing an electricity storage cell of one embodiment of the disclosure.

In the following, embodiments of the disclosure are described in detail with reference to the drawings.

An electricity storage cell 1 is configured by accommodating two battery elements (a first battery element 2A and a second battery element 2B) along with an electrolytic solution (not shown) into a cell can 10 and sealing by an opening sealing body 11. Besides, in directions shown in the respective diagrams, a direction D1 indicates a length direction of the electricity storage cell 1, a direction D2 indicates a thickness direction of the electricity storage cell 1, and a direction D3 indicates a height direction of the electricity storage cell 1. A direction shown by an arrow of the direction D3 is the upward direction along a gravity direction.

The cell can 10 is a bottomed box-shaped container, which is shaped by a metal material such as aluminum, aluminum alloy or the like into a substantially cuboidal shape being long in the direction D1. The cell can 10 is open on the top and has a rectangular opening portion 10a.

The opening sealing body 11 includes a flat-plate member which is formed by a metal material such as aluminum, aluminum alloy or the like into the same rectangular shape as the opening portion 10a of the cell can 10. The opening sealing body 11 is fitted on an inner peripheral surface of the opening portion 10a of the cell can 10, and is joined with respect to the inner peripheral surface of the opening portion 10a by welding, caulking or the like. Accordingly, a joint portion 100 along the opening portion 10a is formed between the opening portion 10a of the cell can 10 and the opening sealing body 11.

The opening sealing body 11 has a positive electrode terminal 12 and a negative electrode terminal 13 which are disposed separately at both ends of the length direction (the direction DD. The positive electrode terminal 12 and the negative electrode terminal 13 respectively penetrate through the opening sealing body 11 and project on an upper surface. The positive electrode terminal 12 and the negative electrode terminal 13 are electrically insulated with the opening sealing body 11 by an insulation material (not shown). In addition, the opening sealing body 11 has a pressure relief valve (a safety valve) 14 and a solution injection port 15 for the electrolytic solution between the positive electrode terminal 12 and the negative electrode terminal 13.

Figure 4:
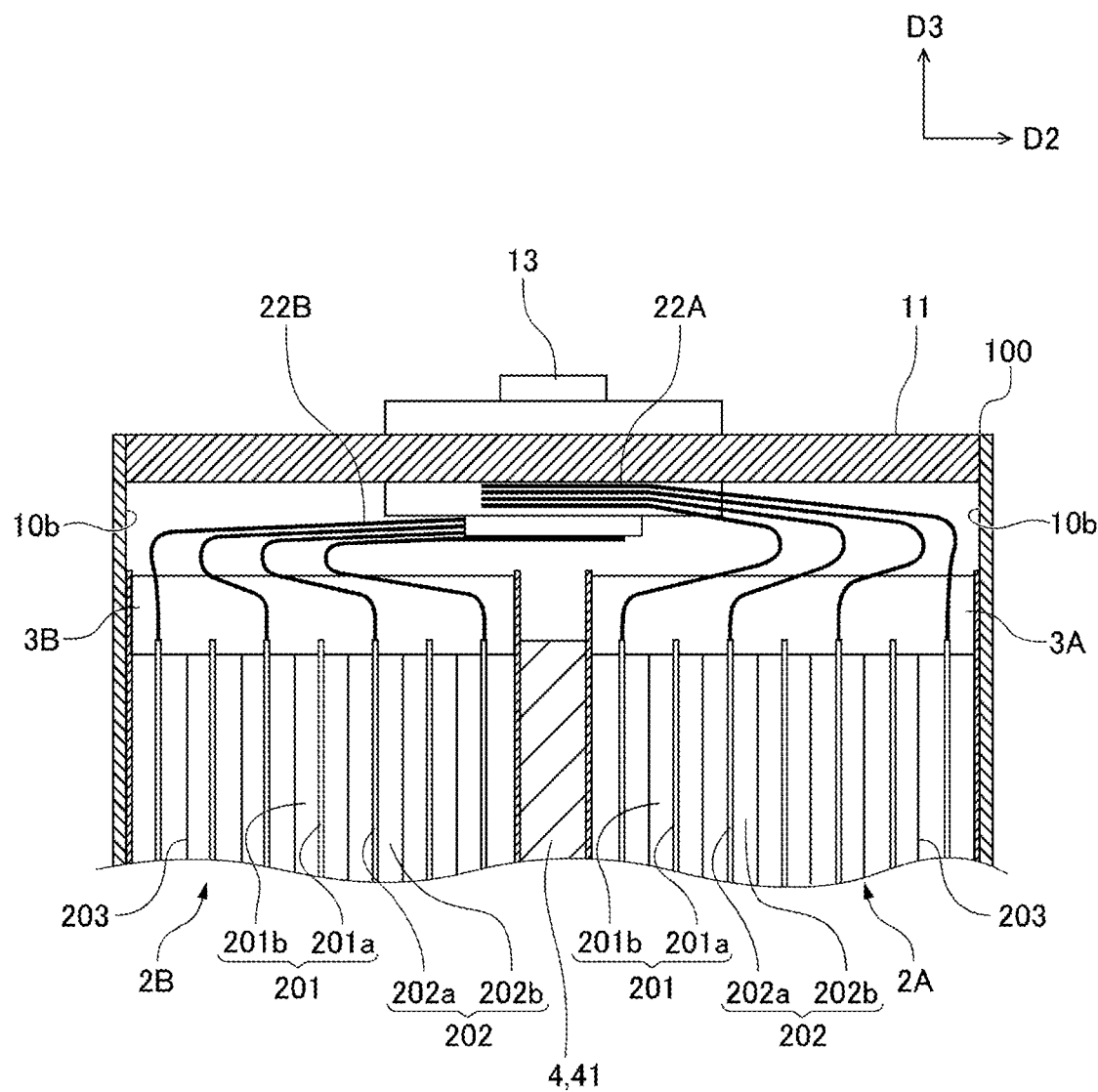
FIG. 4 is a cross-section view showing an upper portion of the electricity storage cell shown in FIG. 3 in an enlarged manner.

As shown in FIG. 4, the first battery element 2A and the second battery element 2B inside the cell can 10 have a lamination structure in which a plurality of positive electrode plates 201 and a plurality of negative electrode plates 202 are alternately laminated via separators 203. The positive electrode plate 201 is configured by a positive electrode foil 201a and a positive electrode active material 201b applied on both surfaces of the positive electrode foil 201a. The negative electrode plate 202 is configured by a negative electrode foil 202a and a negative electrode active material 202b applied on both surfaces of the negative electrode foil 202a.

The first battery element 2A has a positive electrode collection portion 21A and a negative electrode collection portion 22A in the upper portion. In the positive electrode collection portion 21A, upper ends of the positive electrode foils 201a of respective positive electrode plates 201 are partially extended in a band and are laminated and bundled into one. In addition, in the negative electrode collection portion 22A, upper ends of the negative electrode foils 202a of respective negative electrode plates 202 are partially extended in a band and are laminated and bundled into one. The positive electrode collection portion 21A and the negative electrode collection portion 22A are respectively bent sideways in the upper portion of the first battery element 2A, and form a rectangular plane substantially parallel to the opening sealing body 11.

The positive electrode collection portion 21A of the first battery element 2A is disposed in one end portion of the length direction (the direction D1) in the upper portion of the first battery element 2A, and is formed by the upper end of one end portion of the positive electrode foil 201a of each positive electrode plate 201 being partially extended in a band. In addition, the negative electrode collection portion 22A is disposed slightly closer to the center than the other end portion of the length direction (the direction D1) in the upper portion of the first battery element 2A, and is formed by the upper end slightly closer to the center than the other end portion of the negative electrode foil 202a of each negative electrode plate 202 being partially extended in a band.

On the other hand, the second battery element 2B also has a positive electrode collection portion 21B and a negative electrode collection portion 22B in the upper portion. In the positive electrode collection portion 21B, upper ends of the positive electrode foils 201a of respective positive electrode plates 201 are partially extended in a band and are laminated and bundled into one. In addition, in the negative electrode collection portion 22B, upper ends of the negative electrode foils 202a of respective negative electrode plates 202 are partially extended in a band and are laminated and bundled into one. The positive electrode collection portion 21B and the negative electrode collection portion 22B are respectively bent sideways in the upper portion of the second battery element 2B, and form a rectangular plane substantially parallel t to the opening sealing body 11.

The positive electrode collection portion 21B of the second battery element 2B is disposed slightly closer to the center than one end portion of the length direction (the direction D1) in the upper portion of the second battery element 2B, and is formed by the upper end slightly closer to the center than one end portion of the positive electrode foil 201a of each positive electrode plate 201 being partially extended in a band. In addition, the negative electrode collection portion 22B is disposed in the other end portion of the length direction (the direction D1) in the upper portion of the second battery element 2B, and is formed by the upper end of the other end portion of the negative electrode foil 202a of each negative electrode plate 202 being partially extended in a band.

Figure 2:
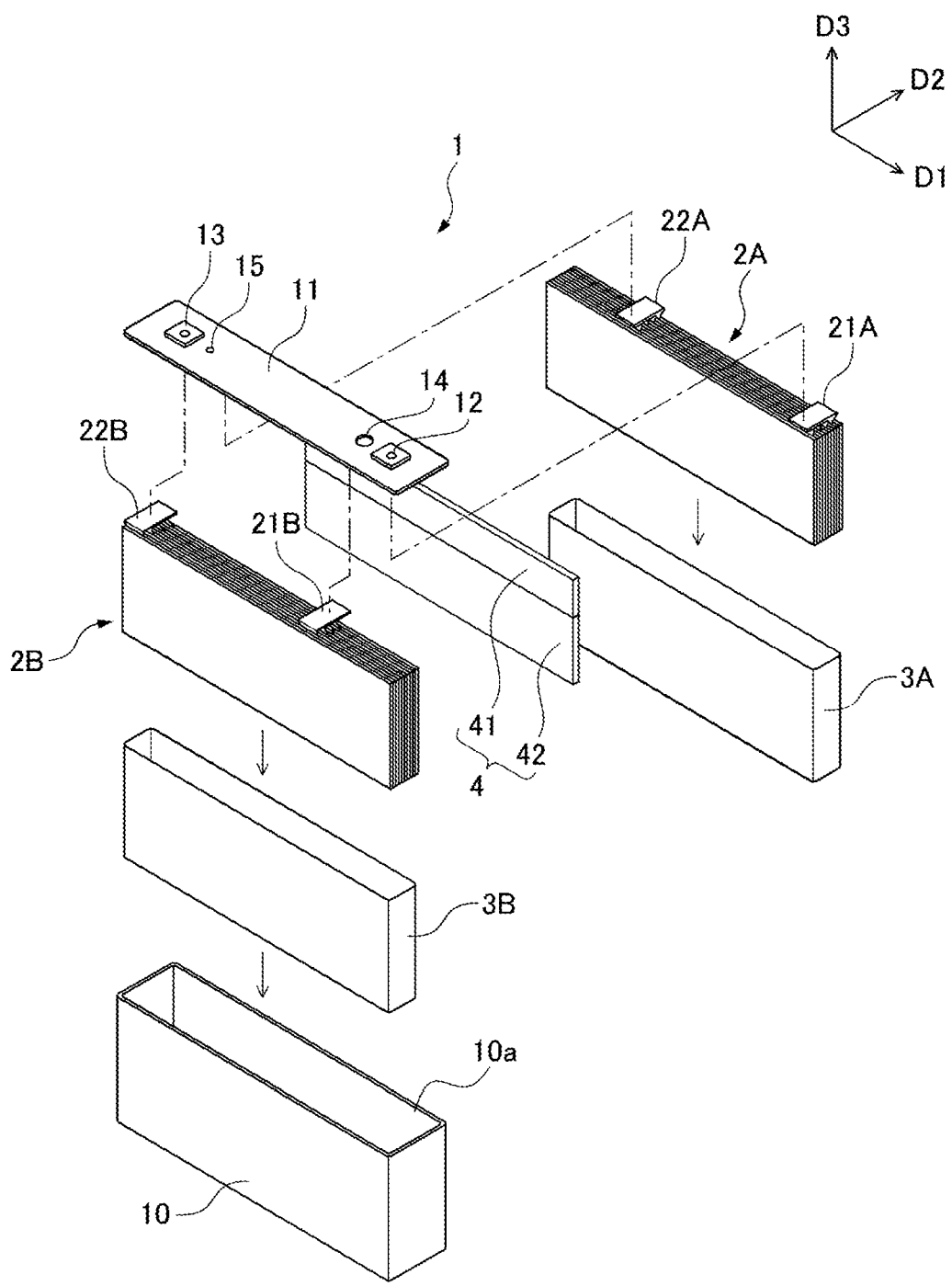
FIG. 2 is an exploded perspective view of the electricity storage cell shown in FIG. 1.
Figure 3:
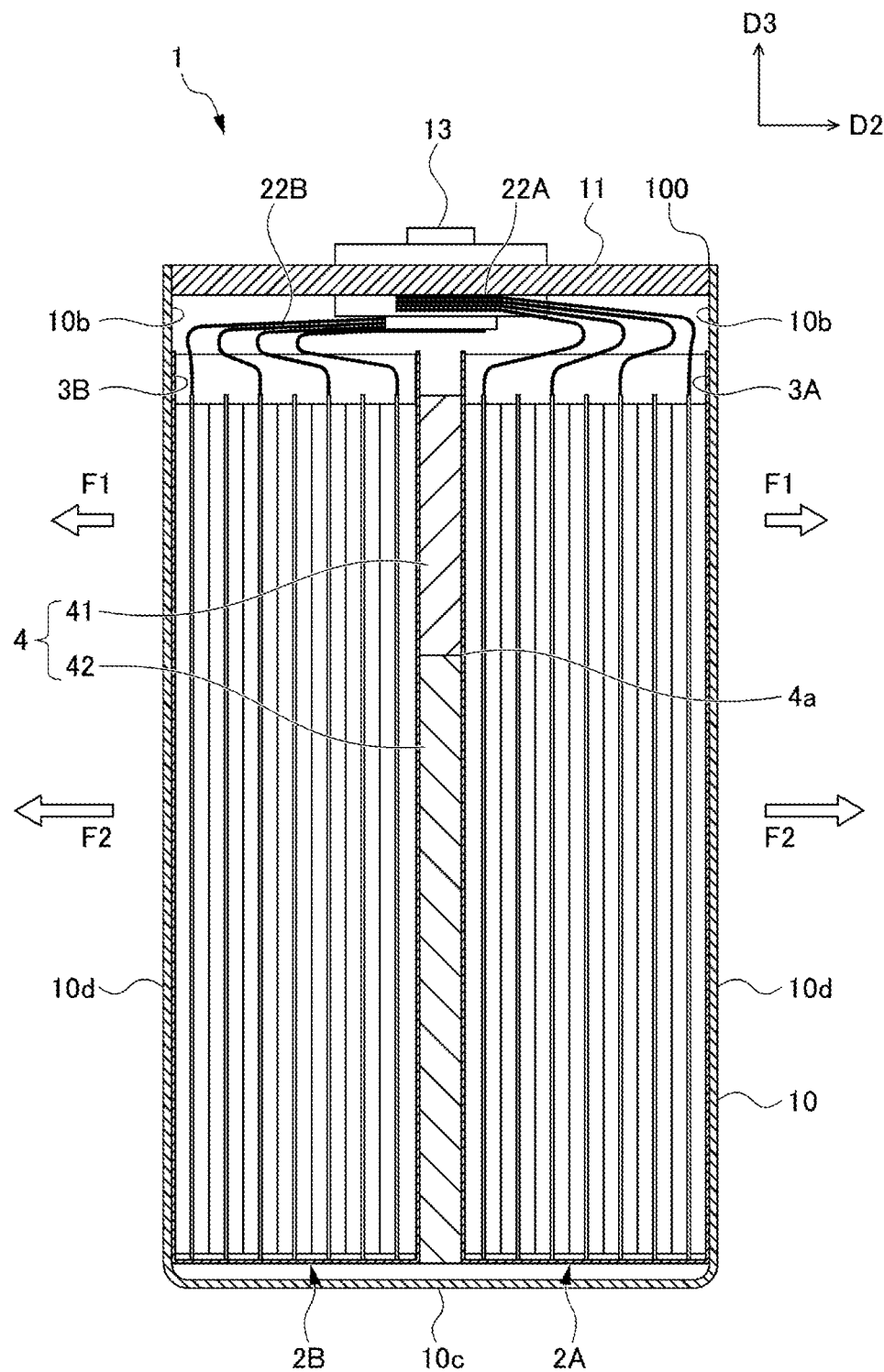
FIG. 3 is a cross-section view along an X-X line in FIG. 1.

As shown in FIG. 2 and FIG. 3, the first battery element 2A and the second battery element 2B are respectively and separately accommodated in insulation members 3A, 3B. The insulation members 3A, 3B are both formed by insulation sheet materials into a baglike shape being open in the upper portion, which is substantially the same shape as the first battery element 2A and the second battery element 2B. The first battery element 2A and the second battery element 2B are respectively accommodated into the insulation members 3A, 3B so that the positive electrode collection portions 21A, 21B and the negative electrode collection portions 22A, 22B are oriented upward. Besides, the first battery element 2A and the second battery element 2B in the following description refer to the first battery element 2A and the second battery element 2B in a state of being accommodated in the insulation members 3A, 3B.

Figure 5:
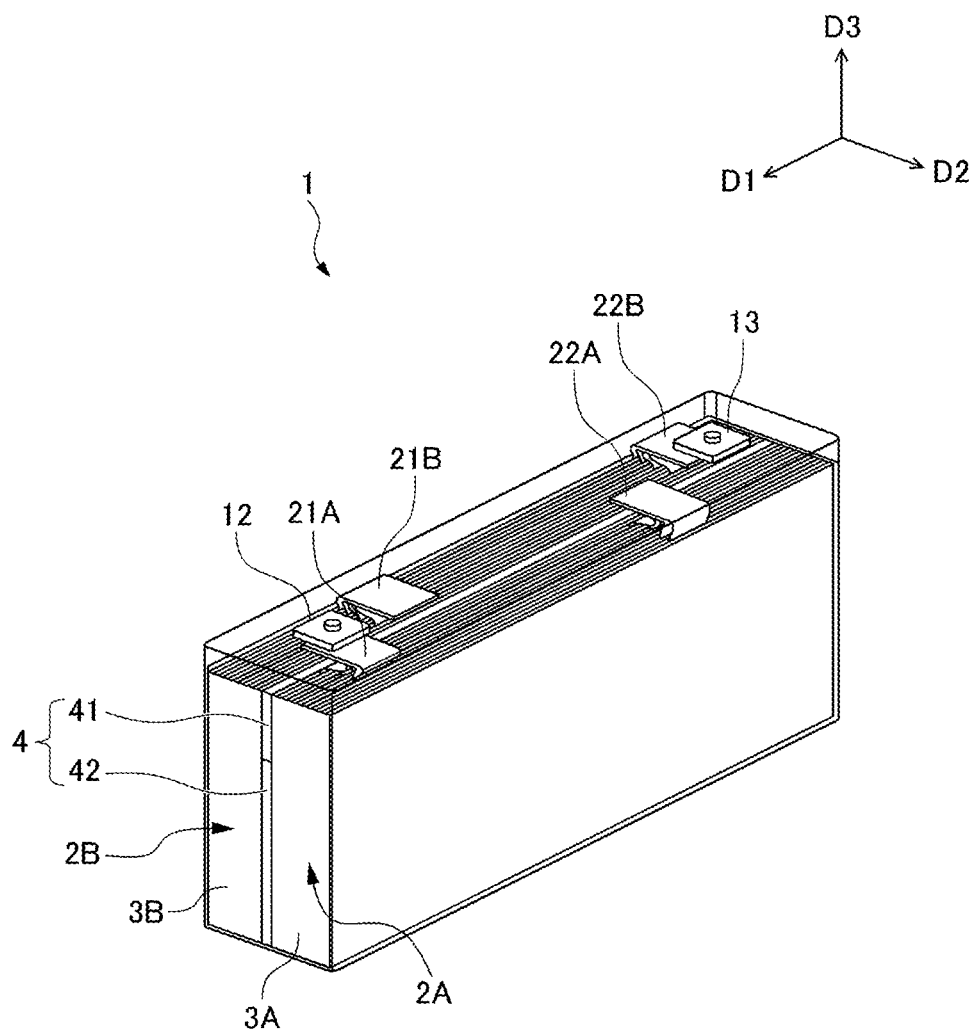
FIG. 5 is a perspective view showing the inside of the electricity storage cell shown in FIG. 1 in a fluoroscopic manner.
Figure 6:
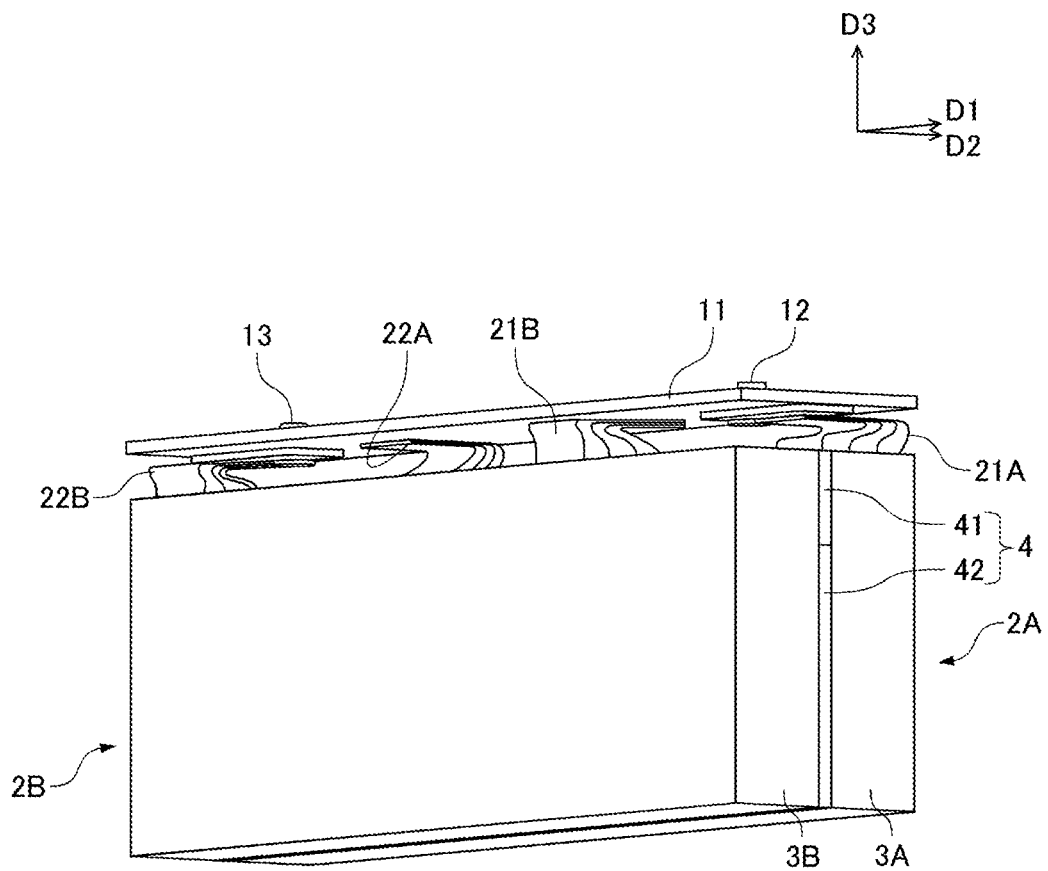
FIG. 6 is a diagram in which battery elements connected to an opening sealing body are viewed from obliquely downward.

The first battery element 2A and the second battery element 2B are arranged in parallel in the thickness direction (the direction D2) of the electricity storage cell 1 along the lamination direction of the positive electrode plates 201 and the negative electrode plates 202. As shown in FIG. 5 and FIG. 6, the positive electrode collection portion 21A of the first battery element 2A is electrically connected to the positive electrode terminal 12 on a reverse surface of the opening sealing body 11. In addition, the negative electrode collection portion 22A of the first battery element 2A is electrically connected to the reverse surface of the opening sealing body 11 closer to the negative electrode terminal 13. On the other hand, the positive electrode collection portion 21B of the second battery element 2B is electrically connected to the reverse surface of the opening sealing body 11 closer to the positive electrode terminal 12. In addition, the negative electrode collection portion 22B of the second battery element 2B is electrically connected to the negative electrode terminal 13 on the reverse surface of the opening sealing body 11. Accordingly, the first battery element 2A and the second battery element 2B inside the cell can 10 are connected in series via the opening sealing body 11.

Inside the cell can 10, the first battery element 2A and the second battery element 2B on which the opening sealing body 11 is mounted and the expansion force absorber 4 are accommodated along with an electrolytic solution (not shown). The expansion force absorber 4 is configured by a sheet-like structure which can absorb the expansion force of the first battery element 2A and the second battery element 2B by receiving the expansion and compressing when the first battery element 2A and the second battery element 2B inside the cell can 10 expand.

The expansion force absorber 4 is formed into a rectangular sheet shape which is substantially the same as the side surface shape of the first battery element 2A and the second battery element 2B (the shape of a side surface facing the direction D2) as shown in FIG. 2, and has a height corresponding to the height of the first battery element 2A and the second battery element 2B as shown in FIG. 3. Besides, the expansion force absorber 4 shown in this embodiment can also be utilized as an insulator by an application of insulation materials or being accommodated into an insulation film.

As shown in FIG. 3, the expansion force absorber 4 is sandwiched between the first battery element 2A and the second battery element 2B to contact closely. The first battery element 2A and the second battery element 2B are respectively in close contact with the inner wall surfaces 10b, 10b of the cell can 10 on the opposite side of a side in contact with the expansion force absorber 4.

The expansion force absorber 4 shown in FIG. 2 and FIG. 3 is divided into two in the height direction (the direction D3). That is, the expansion force absorber 4 is configured by a first absorber 41 disposed on the upper part of the height direction (the opening sealing body 11 side) and a second absorber 42 disposed on the lower part of the height direction (a bottom portion 10c side of the cell can 10). The first absorber 41 and the second absorber 42 are stacked in the height direction. The first absorber 41 is lower in height than the second absorber 42. Accordingly, a boundary portion 4a between the first absorber 41 and the second absorber 42 is disposed closer to the opening sealing body 11 than the central portion of the height direction of the cell can 10.

The first absorber 41 and the second absorber 42 are substantially the same in thickness, but different in rigidity. That is, the rigidity of the first absorber 41 is lower than the rigidity of the second absorber 42. Therefore, when the expansion force of the first battery element 2A and the second battery element 2B is received, the first absorber 41 can be compressed more heavily than the second absorber 42, and more expansion force can be absorbed accordingly.

Here, when the first battery element 2A and the second battery element 2B expand, the expansion force acts substantially equally over the entire surface of the inner wall surfaces 10b, 10b of the cell can 10. However, since the cell can 10 is bottomed and the top of the cell can 10 is sealed by the opening sealing body 11, the central portion of the height direction of the cell can 10 bulges outward most when the cell can 10 is viewed in the height direction. At this time, the lower part of the cell can 10 can sufficiently withstand the expansion force of the first battery element 2A and the second battery element 2B because the bottom portion 10c and a side portion 10d of the cell can 10 are formed integrally. However, as for the upper part of the cell can 10, the stress load is concentrated on the joint portion 100 between the opening portion 10a of the cell can 10 and the opening sealing body 11 when the cell can 10 bulges, which may lead to breakage of the joint portion 100.

In contrast, the expansion force absorber 4 absorbs the expansion force by receiving the expansion of the first battery element 2A and the second battery element 2B inside the cell can 10 and compressing. At this time, the first absorber 41 which is disposed on a side near the opening sealing body 11 is lower in rigidity than the second absorber 42, and thus the first battery element 2A and the second battery element 2B expand more easily toward the expansion force absorber 4 side than toward the inner wall surface 10b side on the side closer to the opening sealing body 11 than the central portion of the height direction of the cell can 10, and the first absorber 41 is compressed more heavily than the second absorber 42 and absorbs more expansion force. As a result, as shown in FIG. 3, an expansion force F1 of the battery element acting on the inner wall surfaces 10b, 10b on the upper side of the cell can 10 corresponding to the first absorber 41 is smaller than an expansion force F2 of the battery element acting on the inner wall surfaces 10b, 10b of the central portion of the cell can 10 corresponding to the second absorber 42. Thus, the stress load on the joint portion 100 is reduced, and the electricity storage cell 1 is excellent in durability.

The expansion force absorber 4 can be used without particular limitations, as long as this expansion force absorber 4 can be formed into a sheet-like shape and can be compressed and absorb the expansion force when receiving the expansion force of the first battery element 2A and the second battery element 2B, but an elastic body or a structure having swellability may be used in one or some exemplary embodiments.

An elastic body made of common rubber or resin can be used as the elastic body. In particular, when the elastic body is a foam body of rubber or resin, the weight reduction and the cost reduction of the electricity storage cell 1 can be achieved. In addition, in the foam body, a difference of rigidity between the first absorber 41 and the second absorber 42 can be easily arranged by setting a foam ratio appropriately.

A swellable resin or a resin fiber aggregate which swells by being impregnated with a liquid (including the electrolytic solution) can be used as the structure having swellability. Accordingly, similar to a case of using the foam body, the weight reduction and the cost reduction of the electricity storage cell 1 can be achieved. PVDF (polyvinylidene fluoride) or a silicone resin is illustrated as a specific swellable resin. In addition, a non-woven laminate of polyolefin-based resin fiber or phenolic resin fiber is illustrated as a specific resin fiber aggregate. The difference of rigidity between the first absorber 41 and the second absorber 42 can be arranged by appropriately setting density, type, diameter, length, and shape of the resin or the resin fiber.

The first battery element 2A and the second battery element 2B shown in the embodiment are respectively in close contact with the inner wall surfaces 10b, 10b on the opposite side of the side in contact with the expansion force absorber 4 inside the cell can 10. Accordingly, heat of the first battery element 2A and the second battery element 2B is transmitted from the inner wall surfaces 10b, 10b of the cell can 10 to the cell can 10. Therefore, an outer side surface of the cell can 10 can be utilized as a heat transfer surface. In addition, the expansion force absorber 4 is used in common in the first battery element 2A and the second battery element 2B, and thus the amount of the expansion force absorber 4 with respect to the amount of the battery element inside the cell can 10 can be reduced, and the simplification of the cell structure and the cost reduction can be achieved.

In addition, by disposing the expansion force absorber 4 between the first battery element 2A and the second battery element 2B, an insulation distance equivalent to the thickness of the expansion force absorber 4 can be arranged between the first battery element 2A and the second battery element 2B. Therefore, it is possible not to arrange another insulation member for ensuring the insulation distance between the first battery element 2A and the second battery element 2B which are connected in series. Accordingly, the simplification of the cell structure and the cost reduction can be further achieved.

By expanding along the thickness direction (the direction D2) inside the cell can 10, the expansion force absorber 4 may press the first battery element 2A and the second battery element 2B toward the inner wall surfaces 10b, 10b of the cell can 10, and hold the first battery element 2A and the second battery element 2B between the expansion force absorber 4 and the inner wall surfaces 10b, 10b of the cell can 10. Accordingly, a contact thermal resistance between the first battery element 2A and the second battery element 2B and the inner wall surfaces 10b, 10b of the cell can 10 is reduced, and a temperature increase of the first battery element 2A and the second battery element 2B can be suppressed. In addition, even when the first battery element 2A and the second battery element 2B are small-expansion battery elements using oxide negative electrode materials and the like such as LTO (lithium titanate), the first battery element 2A and the second battery element 2B can be evenly pressed to the inner wall surfaces 10b, 10b of the cell can to be held.

The battery element having a lamination structure in which the positive electrode plate 201 and the negative electrode plate 202 are laminated to sandwich the separator 203 as the first battery element 2A and the second battery element 2B of the embodiment is different from the battery element having a wound structure, and does not have a deformation effect brought by the wound portion, and thus it is difficult to ensure a pressing load on the inner wall surfaces 10b, 10b inside the cell can 10. However, by the expansion force absorber 4 expanding inside the cell can 10, the pressing load on the inner wall surfaces 10b, 10b of the cell can 10 can be easily ensured even in a case that the first battery element 2A and the second battery element 2B having a lamination structure are used.

The expansion of the expansion force absorber 4 can utilize, for example, an expansion caused by an elastic restoring force when the expansion force absorber 4 is an elastic body or by the swelling when the expansion force absorber 4 is a structure having swellability. However, the expansion force of the expansion force absorber 4 in this case acting on the first battery element 2A and the second battery element 2B is smaller than the expansion force of the first battery element 2A and the second battery element 2B acting on the expansion force absorber 4. Therefore, the expansion force of the expansion force absorber 4 itself is not an obstacle during absorption of the expansion force of the first battery element 2A and the second battery element 2B.

Figure 7:
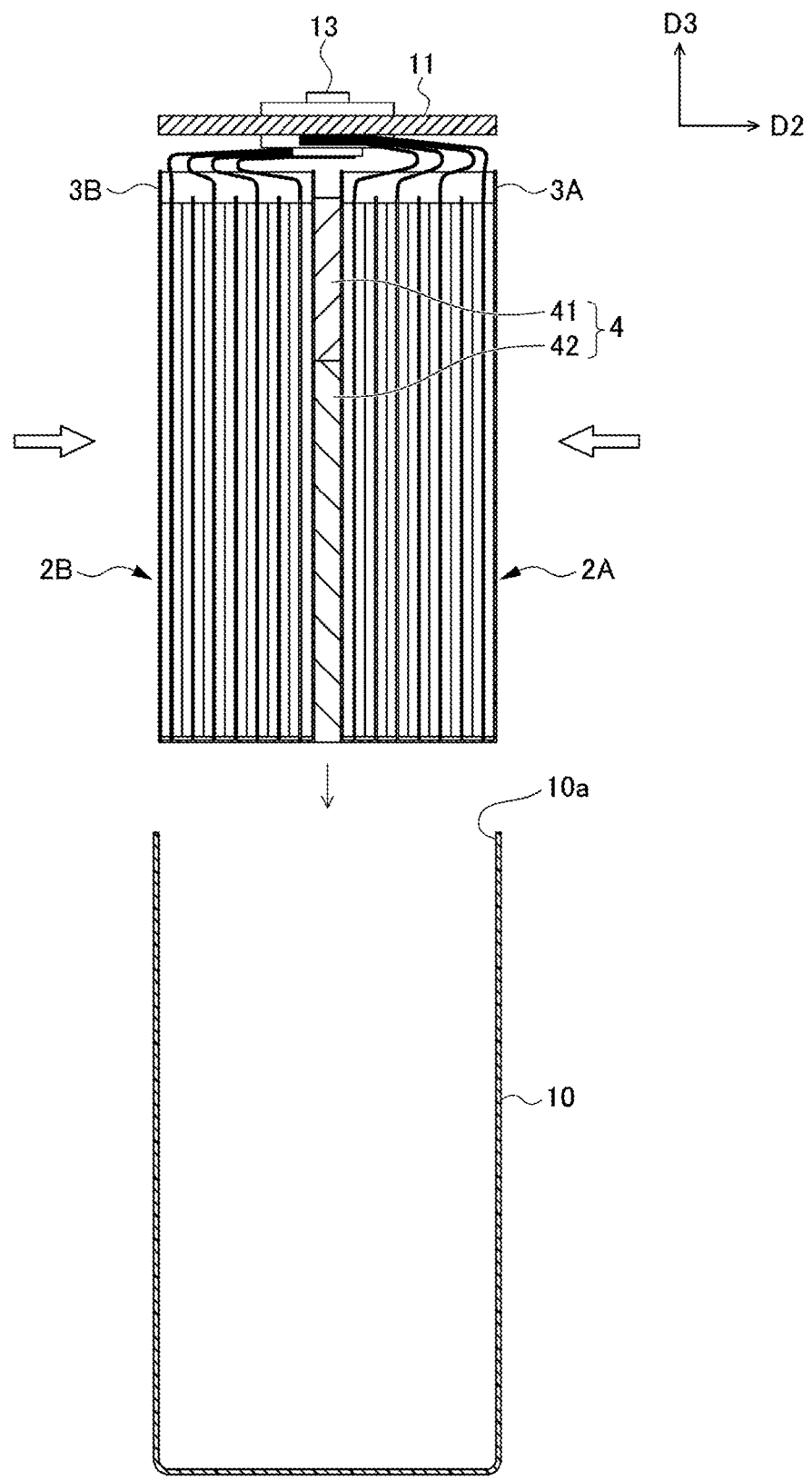
FIG. 7 is a cross-section view illustrating a manufacturing method of an electricity storage cell of an embodiment of the disclosure.

In order that the expansion force absorber 4 exerts a function to press and hold the first battery element 2A and the second battery element 2B in this way, a method in which the expansion force absorber 4 is accommodated into the cell can 10 in a crushed state can be adopted. That is, as shown in FIG. 7, firstly, the first battery element 2A and the second battery element 2B on which the opening sealing body 11 is mounted in advance are laminated to sandwich the expansion force absorber 4. Next, by compressing the first battery element 2A and the second battery element 2B from both sides of the thickness direction (the direction D2), the expansion force absorber 4 is inserted along with the first battery element 2A and the second battery element 2B into the cell can 10 in a state of crushing the expansion force absorber 4 in the thickness direction. After that, when the expansion force absorber 4 expands due to the elastic restoring force or the swelling inside the cell can 10, the expansion force absorber 4 presses the first battery element 2A and the second battery element 2B to the inner wall surfaces 10b, 10b of the cell can 10 to hold the first battery element 2A and the second battery element 2B.

Besides, a width of the thickness direction (the direction D2) of the cell can 10 in this case is set smaller than a width of the thickness direction (the direction D2) before compression of a laminate including the first battery element 2A, the expansion force absorber 4 and the second battery element 2B so as to exert the pressing force brought by the expansion of the expansion force absorber 4. However, the expansion force absorber 4 is crushed and deforms during the insertion into the cell can 10, and thus the laminate including the first battery element 2A, the expansion force absorber 4 and the second battery element 2B can be easily inserted into the cell can 10, and an effect of assemblability improvement of the electricity storage cell 1 is obtained.

Figure 8:
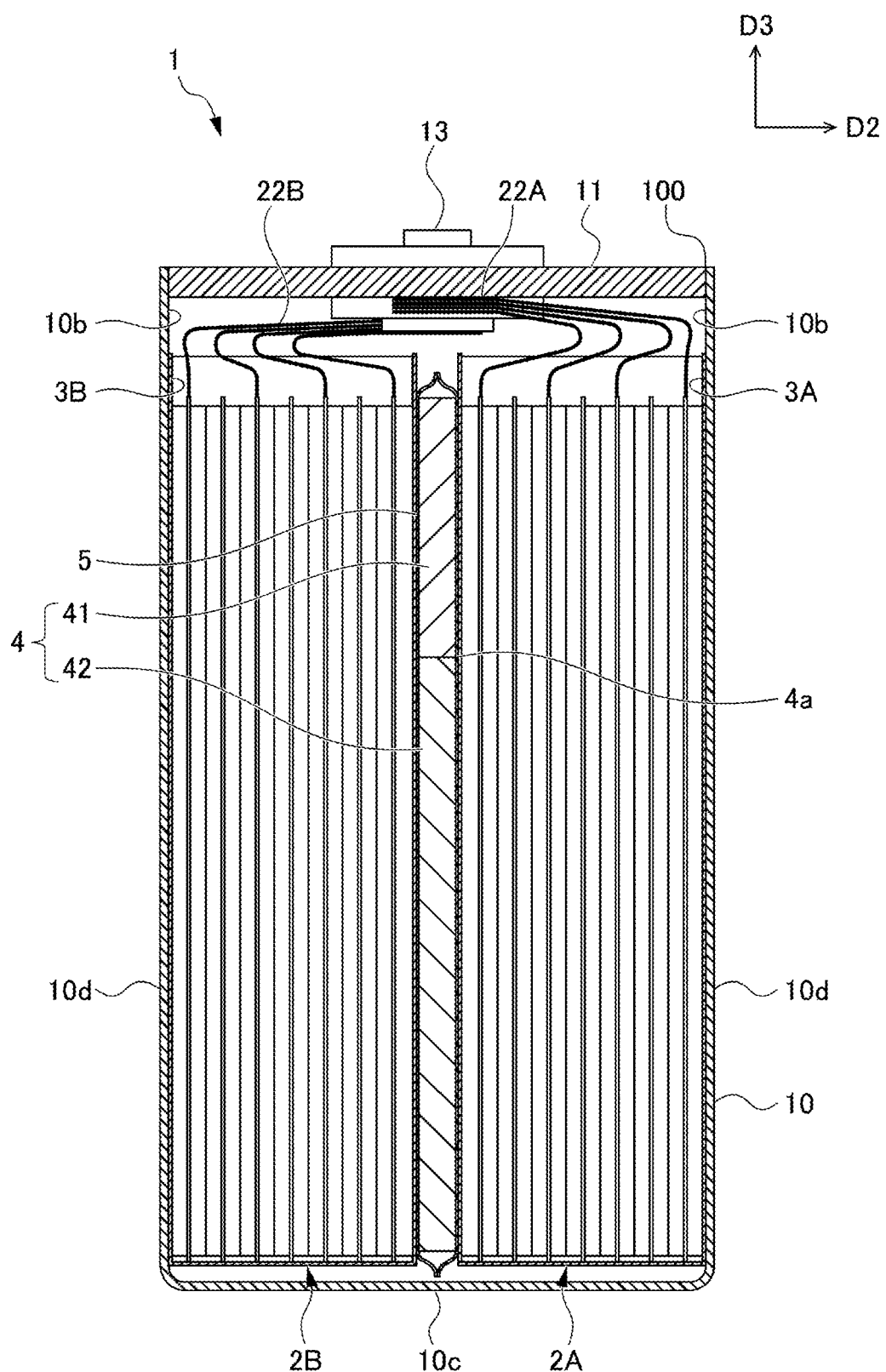
FIG. 8 is a cross-section view of an electricity storage cell of another embodiment of the disclosure.

The first battery element 2A and the second battery element 2B in the electricity storage cell 1 can also be set as a battery element consisting of an all-solid-state battery that does not require the electrolytic solution, but when the electrolytic solution is accommodated into the cell can 10 as in this embodiment, the expansion force absorber 4 may be sealed into the impermeable film 5 as shown in FIG. 8. Accordingly, a contact of the electrolytic solution with the expansion force absorber 4 or a bleeding of the electrolytic solution into the expansion force absorber 4 disappear, and thus a deterioration or a characteristic change of the expansion force absorber 4 is prevented, and an absorption action on the expansion force of the battery element can be stabilized for a long time. In addition, the electrolytic solution inside the cell can 10 can be limited to and impregnated in a part of the first battery element 2A and the second battery element 2B, and thus the used amount of the electrolytic solution can be reduced, and the cost reduction can also be achieved.

Any film can be used as the impermeable film 5 without particular limitations as long as this film has a property of resisting the electrolytic solution due to impermeability. Generally, a resin film of polyethylene or the like is used, but a laminate film formed by an integral lamination of resin and metal may also be used.

Figure 9:
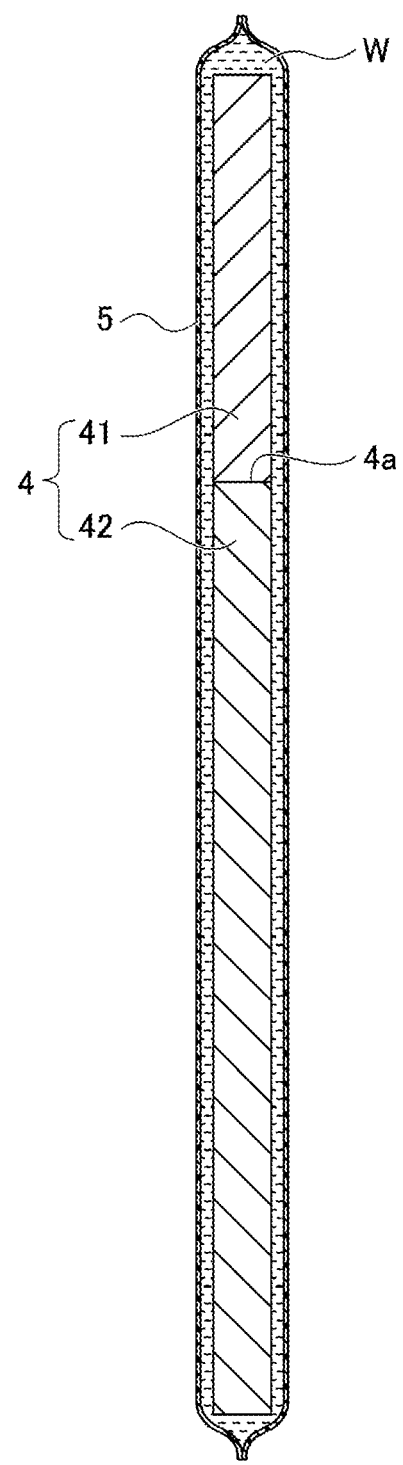
FIG. 9 is a cross-section view showing one example of an expansion force absorber which is sealed into a resin film.

When the expansion force absorber 4 is a structure having swellability, as shown in FIG. 9, the expansion force absorber 4 may be sealed along with a liquid W into the impermeable film 5. The expansion force absorber 4 can be made to swell by the liquid W in the impermeable film 5, and thus the absorption action on the expansion force of the battery element can be exerted well from the beginning without waiting for an injection of the electrolytic solution. In addition, a swelling amount of the expansion force absorber 4 can also be adjusted by appropriately adjusting an amount of the liquid W. Besides, only an amount of the liquid W sufficient to make the expansion force absorber 4 swell is sealed, and the absorption action on the expansion force of the expansion force absorber 4 is not affected.

A liquid formed by removing additives from the electrolytic solution or another liquid different from the electrolytic solution can be used as the liquid W. Cost reduction can be achieved by using a liquid (for example, an organic solvent) cheaper than the electrolytic solution. In addition, when an inactive solvent is used as the liquid W, safety can be further improved. Besides, the expansion force absorber 4 having swellability which is sealed along with the liquid W into the impermeable film 5 can also be applied when the first battery element 2A and the second battery element 2B are the battery elements consisting of all-solid-state battery.

Figure 10:
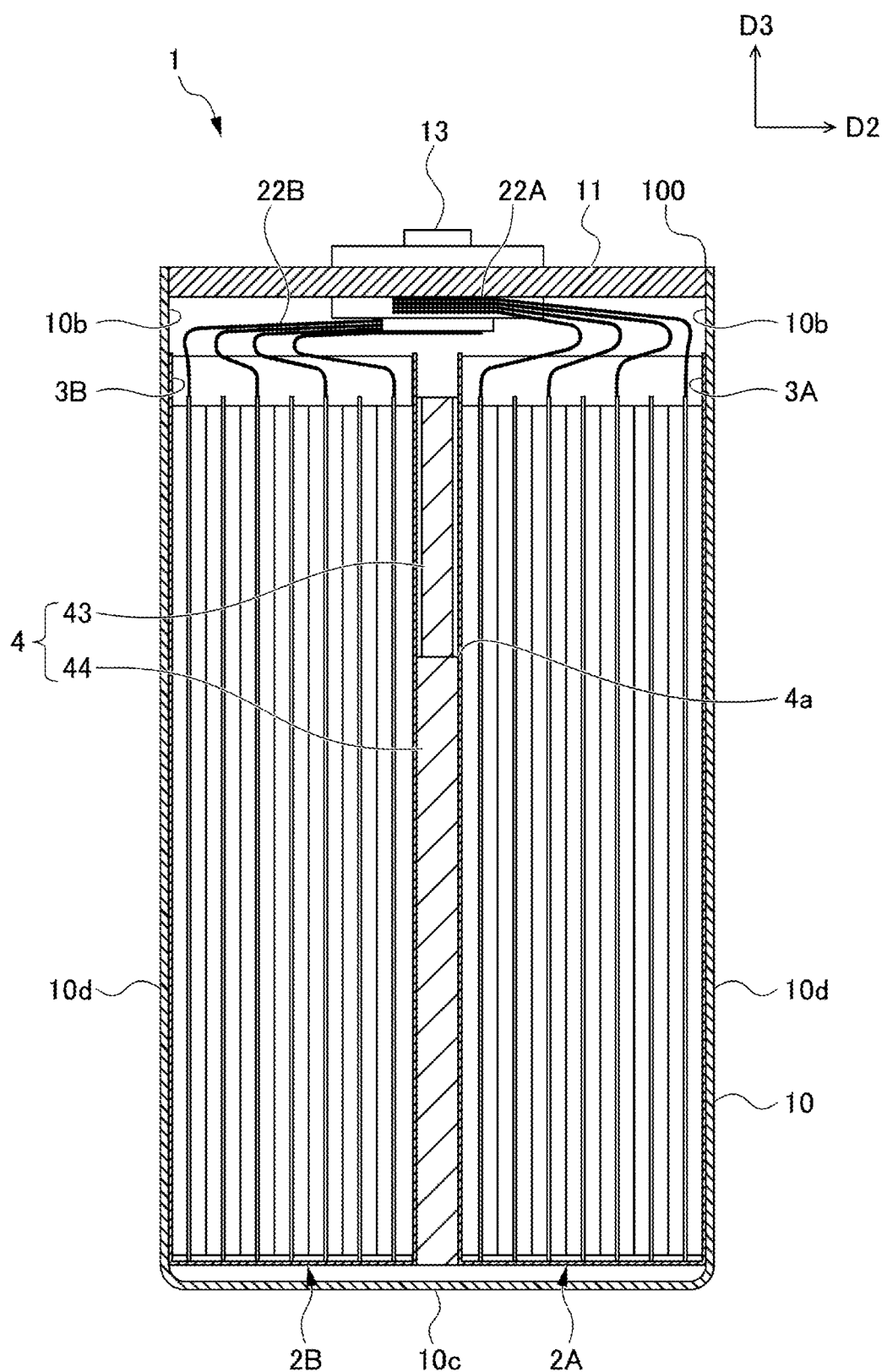
FIG. 10 is a cross-section view of an electricity storage cell of still another embodiment of the disclosure.

Instead of making the rigidity different between the first absorber 41 and the second absorber 42 as described above, the expansion force absorber 4 may make the thickness different between a first absorber 43 and a second absorber 44 as the expansion force absorber 4 shown in FIG. 10. That is, the thickness of the first absorber 43 disposed on the opening sealing body 11 side is formed to be smaller than the thickness of the second absorber 44. Accordingly, the first battery element 2A and the second battery element 2B expand more easily toward the expansion force absorber 4 side than toward the inner wall surface 10b side on the opening sealing body 11 side than on the central portion of the height direction of the cell can 10, and an effect similar to the case in which the rigidity is made different can be obtained.

The elastic body or the structure having swellability described above can also be used in the first absorber 43 and the second absorber 44. The first absorber 43 and the second absorber 44 may use the same quality of material or different qualities of material as long as the thicknesses are different, but in order not to impair the absorption effect of the expansion force of the opening sealing body 11 side due to the difference of thickness, the rigidities of the first absorber 43 and the second absorber 44 are desired to be substantially the same.

Figure 11:
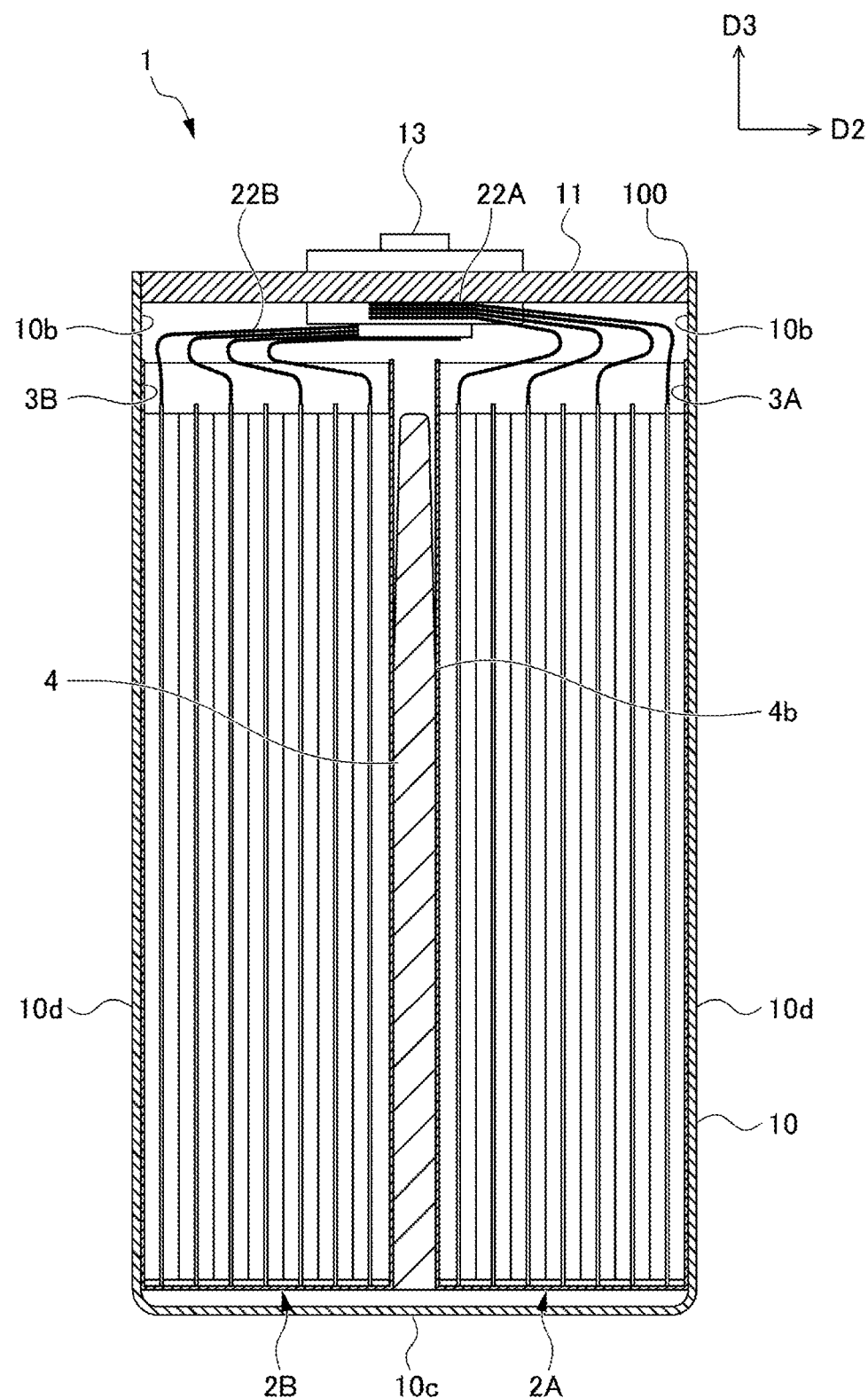
FIG. 11 is a cross-section view of an electricity storage cell of still another embodiment of the disclosure.

In addition, when the thickness of the expansion force absorber 4 is different, as shown in FIG. 11, the expansion force absorber 4 may be formed integrally at a height corresponding to the height of the first battery element 2A and the second battery element 2B. The expansion force absorber 4 in this case is formed so that the thickness above a section 4b which is closer to the opening sealing body 11 than the central portion of the height direction of the cell can 10 is smaller than the thickness below the section 4b. The expansion force absorber 4 shown in FIG. 11 is formed into a taper shape which gradually becomes thinner on the upper side, but the expansion force absorber 4 is not particularly limited to the taper shape. In addition, similar to the expansion force absorber 4 shown in FIG. 8 and FIG. 9, the expansion force absorber 4 in which the thickness is made different in this way may also be sealed into the impermeable film 5. Furthermore, the expansion force absorber 4 in which the thickness is made different may also be crushed and accommodated into the cell can 10 and thereby press the first battery element 2A and the second battery element 2B to the inner wall surfaces 10b, 10b of the cell can 10 inside the cell can 10 to hold the first battery element 2A and the second battery element 2B.

The electricity storage cell 1 which is configured as above is usually modularize by laminating a plurality of electricity storage cell 1 in the thickness direction (the direction D2). The modularized electricity storage cell 1 is arranged in a manner that a side surface (a side surface facing the direction D1) or a bottom surface thereof is pressed to a heat sink or a temperature control device. In this case, since the cell can 10 can be utilized as a heat conduction member, a heat transfer plate is not required, and the number of component can be reduced and the cost reduction can be achieved.

The expansion force absorber 4 with a division structure is not limited to the expansion force absorber which is divided into two, that is, divided into the first absorbers 41, 43 and the second absorbers 42, 44. For example, the expansion force absorber 4 may be divided into three, namely the central portion of the height direction of the cell can 10, the opening sealing body 11 side above the central portion, and the bottom portion 10c side below the central portion. In this case, similar to the absorber of the opening sealing body 11 side, the absorber of the bottom portion 10c side below the central portion may also be low in rigidity or small in thickness.

In addition, there may be only one battery element accommodated in the cell can 10. In this case, the expansion force absorber 4 is disposed between one inner wall surface 10b of the cell can 10 and the battery element.

According to the electricity storage cell recited above, the expansion of the battery element can be absorbed by the expansion force absorber inside the cell can, and thus a force by which the battery element causes the cell can to bulge outward is reduced. Accordingly, the stress load on the joint portion between the cell can and the opening sealing body during the expansion of the battery element can be reduced. Moreover, the battery element more easily expands toward the expansion force absorber side on the opening sealing body side than in the central portion of the height direction of the cell can, and thus the stress load on the joint portion between the cell can and the opening sealing body can be further reduced.

In the electricity storage cell recited above, the expansion force absorber may include an elastic body or a structure having swellability.

According to the electricity storage cell recited above, the expansion force absorber can receive the expansion of the battery element and easily compress to well absorb the expansion force of the battery element in a state of closely contacting with the battery element.

In the electricity storage cell recited above, the elastic body may be a foam body, and the structure having swellability may be a swellable resin or a resin fiber aggregate.

According to the electricity storage cell recited above, weight reduction and cost reduction may be achieved.

According to the electricity storage cell recited above, the expansion of the battery element can be absorbed by the expansion force absorber inside the cell can, and thus a force by which the battery element causes the cell can to bulge outward is reduced. Accordingly, the stress load on the joint portion between the cell can and the opening sealing body during the expansion of the battery element can be reduced. Moreover, a contact of the electrolytic solution with the expansion force absorber or a bleeding of the electrolytic solution into the expansion force absorber disappears, a deterioration or a characteristic change of the expansion force absorber is prevented, and thereby an absorption action on the expansion force of the battery element can be stabilized for a long time. In addition, the electrolytic solution can be limited to and impregnated in a part of the battery element, and thus a used amount of the electrolytic solution can be reduced, and cost reduction can be achieved.

In the electricity storage cell recited above, the expansion force absorber may include an elastic body or a structure having swellability.

According to the electricity storage cell recited above, the expansion force absorber can receive the expansion of the battery element and easily compress to well absorb the expansion force of the battery element in a state of closely contacting with the battery element.

In the electricity storage cell recited above, the elastic body may be a foam body, and the structure having swellability may be a swellable resin or a resin fiber aggregate.

According to the electricity storage cell recited above, weight reduction and cost reduction may be achieved.

In the electricity storage cell recited above, the structure having swellability may be sealed along with a liquid (for example, a liquid W described later) into the impermeable film.

According to the electricity storage cell recited above, the expansion force absorber can be made to swell by the liquid inside the resin film, and thus the absorption action on the expansion force of the battery element can be exerted well from the beginning.

In the electricity storage cell recited above, the liquid may be a liquid which is formed by removing additives from the electrolytic solution or another liquid different from the electrolytic solution.

According to the electricity storage cell recited above, a liquid cheaper than the electrolytic solution can be used, and cost reduction can be achieved.

In the electricity storage cell recited above, the expansion force absorber may press the battery element to the inner wall surface of the cell can to hold the battery element by expanding in a thickness direction inside the cell can.

According to the electricity storage cell recited above, a contact thermal resistance between the battery element and the inner wall surface of the cell can is reduced, and a temperature increase of the battery element can also be suppressed. In addition, even when the battery element is a small-expansion battery element using oxide negative electrode materials and the like, the battery element can be evenly pressed to the inner wall surface of the cell can to hold the battery element.

In the electricity storage cell recited above, two battery elements may be accommodated into the cell can, and the expansion force absorber may be sandwiched between the two battery elements.

According to the electricity storage cell recited above, two side surfaces of the cell can be utilized as heat transfer surfaces, and the expansion force absorber can be utilized in common in the two battery elements, and thus simplification of the cell structure and cost reduction can be achieved.

In the electricity storage cell recited above, the two battery elements may be connected in series inside the cell can.

According to the electricity storage cell recited above, the expansion force absorber can be utilized as an insulation distance between the two battery elements, and thus it is possible not to arrange another insulation member between the two battery elements, and simplification of the cell structure and cost reduction can be achieved.

According to the manufacturing method of an electricity storage cell recited above, the battery element inside the cell can be evenly pressed to the inner wall surface of the cell can and held by the expansion force of the crushed expansion force absorber itself, and thus a contact thermal resistance between the battery element and the inner wall surface of the cell can is reduced, and a temperature increase of the battery element can also be suppressed. Moreover, even when the battery element is a small-expansion battery element using oxide negative electrode materials and the like, the battery element can be evenly pressed to the inner wall surface of the cell can to be held. Furthermore, when the battery element is inserted into the cell can, the battery element can be inserted easily due to crushing and deformation of the expansion force absorber, and assemblability of the electricity storage cell is improved.

The disclosure can provide an electricity storage cell and a manufacturing method of an electricity storage cell which can reduce a stress load on a joint portion between a cell can and an opening sealing body and caused by expansion of a battery element.

What is claimed is:

1. An electricity storage cell, in which a battery element is accommodated inside a cell can and an upper opening portion of the cell can is sealed by an opening sealing body, wherein inside the cell can, there is an expansion force absorber which is sheet-like and capable of absorbing expansion force of the battery element by receiving expansion of the battery element and compressing; the battery element is disposed between the expansion force absorber and an inner wall surface of the cell can; and the expansion force absorber has a height corresponding to the height of the battery element, and has a lower rigidity on the opening sealing body side than in a central portion of the height direction of the cell can, or has a smaller thickness on the opening sealing body side than in the central portion of the height direction of the cell can, and wherein the expansion force absorber itself has different rigidity on two sides, or the expansion force absorber itself has different thickness on two sides.

2. The electricity storage cell according to claim 1, wherein the expansion force absorber comprises an elastic body or a structure having swellability.

3. The electricity storage cell according to claim 2, wherein the elastic body is a foam body, and
the structure having swellability is a swellable resin or a resin fiber aggregate.

4. An electricity storage cell, in which a battery element and an electrolytic solution are accommodated inside a cell can and an upper opening portion of the cell can is sealed by an opening sealing body, wherein inside the cell can, there is an expansion force absorber which is sheet-like and capable of absorbing expansion force of the battery element by receiving expansion of the battery element and compressing; the battery element is disposed between the expansion force absorber and an inner wall surface of the cell can; and the expansion force absorber is sealed into an impermeable film, and wherein the expansion force absorber itself has different rigidity on two sides, or the expansion force absorber itself has different thickness on two sides.

5. The electricity storage cell according to claim 4, wherein the expansion force absorber comprises an elastic body or a structure having swellability.

6. The electricity storage cell according to claim 5, wherein the elastic body is a foam body, and
the structure having swellability is a swellable resin or a resin fiber aggregate.

7. The electricity storage cell according to claim 5, wherein the structure having swellability is sealed along with a liquid into the impermeable film.

8. The electricity storage cell according to claim 7, wherein the liquid is a liquid which is formed by removing additives from the electrolytic solution or another liquid different from the electrolytic solution.

9. The electricity storage cell according to claim 4, wherein the expansion force absorber presses the battery element to the inner wall surface of the cell can to hold the battery element by expanding in a thickness direction inside the cell can.

10. The electricity storage cell according to claim 4, wherein the battery element is configured to have two battery elements accommodated inside the cell can; and
the expansion force absorber is sandwiched between the two battery elements.

11. The electricity storage cell according to claim 10, wherein the two battery elements are connected in series inside the cell can.

12. A manufacturing method of an electricity storage cell, which manufactures an electricity storage cell in which a battery element is accommodated inside a cell can and an upper opening portion of the cell can is sealed by an opening sealing body, wherein an expansion force absorber which is sheet-like and capable of absorbing expansion force of the battery element by receiving expansion of the battery element and compressing is laminated with the battery element; the expansion force absorber has a height corresponding to the height of the battery element, and has a lower rigidity on the opening sealing body side than in a central portion of the height direction of the cell can, or has a smaller thickness on the opening sealing body side than in the central portion of the height direction of the cell can; the expansion force absorber is inserted along with the battery element into the cell can in a state of being crushed in the thickness direction; and after that, the battery element is pressed to an inner wall surface of the cell can and held by the expansion of the expansion force absorber, and wherein the expansion force absorber itself has different rigidity on two sides, or the expansion force absorber itself has different thickness on two sides.

* * * * *